(12) United States Patent
Boley et al.

(10) Patent No.: US 8,521,160 B2
(45) Date of Patent: Aug. 27, 2013

(54) METHOD AND APPARATUS FOR HANDLING URA INFORMATION

(75) Inventors: Ajit Singh Boley, Birmingham (GB); Andrew John Farnsworth, Bromsgrove (GB); Richard Charles Burbidge, Hook (GB)

(73) Assignee: Blackberry Limited, Waterloo, Ontario (CA)

( * ) Notice: Subject to any disclaimer, the term of this patent is extended or adjusted under 35 U.S.C. 154(b) by 391 days.

(21) Appl. No.: 12/856,463

(22) Filed: Aug. 13, 2010

(65) Prior Publication Data

US 2012/0040669 A1 Feb. 16, 2012

(51) Int. Cl.
*H04W 4/00* (2009.01)
*H04B 7/00* (2006.01)

(52) U.S. Cl.
USPC ........................................ 455/435.1; 370/310

(58) Field of Classification Search
USPC ....................................................... 455/435.1
See application file for complete search history.

(56) References Cited

U.S. PATENT DOCUMENTS

| | | | |
|---|---|---|---|
| 6,618,589 B1* | 9/2003 | Rune et al. ................. | 455/435.1 |
| 2003/0092439 A1* | 5/2003 | D'Herbemont et al. ...... | 455/426 |
| 2003/0157927 A1* | 8/2003 | Yi et al. ........................ | 455/411 |
| 2007/0135080 A1* | 6/2007 | Islam et al. ................ | 455/343.1 |
| 2008/0108346 A1* | 5/2008 | Umatt et al. ................ | 455/432.1 |
| 2009/0042560 A1 | 2/2009 | Islam et al. | |
| 2009/0052376 A1* | 2/2009 | Cave et al. ..................... | 370/328 |
| 2010/0085961 A1* | 4/2010 | Zhao et al. ..................... | 370/352 |
| 2011/0205964 A1* | 8/2011 | Fix et al. ........................ | 370/328 |

FOREIGN PATENT DOCUMENTS

WO 0131940 A2 5/2001

OTHER PUBLICATIONS

3GPP TS 25.331 v9.0.0; 3rd Generation Partnership Project; Technical Specification Group Radio Access Network; Radio Resource Control (RRC); Protocol Specification; Release 9; Sep. 2009; 1710 pgs.
Extended European Search Report; EP Application No. 10172829.3; Dec. 23, 2010; 12 pages.
3GPP TSG-RAN Working Group 2; Transition from CELL_DCH to CELL_PCH and URA_PCH states; Ericsson; 6.1; R2-001353; Paris, France; Jul. 3-7, 2000; 29 pages.
3GPP TSG-RAN Working Group 3 Meeting #18; Inconsistency in URA Handling between RRC and RNSAP; Ericsson; rb-5.4 b; R3-010047; Stockholm, Sweden; Jan. 15-19, 2001; 5 pages.
3GPP TSG-RAN5 Meeting #33; Introduction of New Interband Test Case 8.3.2.1a; Motorola; 6.4.0; R5-063320; Riga, Latvia; Nov. 6-10, 2006; 11 pages.
3GPP TSG-RAN WG2 Meeting #71; URA Identity Handling; Research In Motion UK Limited; R2; R2-104812; Madrid, Spain; Aug. 23-27, 2010; 13 pages.

\* cited by examiner

*Primary Examiner* — Matthew Sams
(74) *Attorney, Agent, or Firm* — Conley Rose, P.C.; J. Robert Brown, Jr.

(57) ABSTRACT

A method and apparatus for handling URA information for a wireless communication device are disclosed. A method for handling URA information for a wireless communication device, the device configured to be operable in a mobile telecommunications system, the method comprising, at the device receiving a message to enter a new state, and initiating a URA update procedure dependent on the message not comprising a URA information.

25 Claims, 8 Drawing Sheets

METHOD AND APPARATUS FOR HANDLING URA INFORMATION

BACKGROUND

This application relates to mobile telecommunications systems in general, and in particular relates to a method and apparatus for handling UTRAN registration area (URA) information for a wireless communication device.

DESCRIPTION OF THE RELATED ART

In a typical cellular radio system, mobile user equipment (UE) communicates via a radio access network (RAN) to a core network. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

A radio access network covers a geographical area typically divided into a plurality of cell areas. Each cell area is served by at least one base station, which in UMTS may be referred to as a Node B. Each cell is typically identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for third generation public land mobile telecommunication systems, each in their respective areas of competence. For instance, the 3GPP (Third Generation Partnership Project) in addition to publishing and setting standards for UMTS, also publishes and sets standards GSM (Global System for Mobile Communications) 3GPP2 (Third Generation Partnership Project 2) publishes and sets standards for CDMA (Code Division Multiple Access). The 3GPP 25.331 specification, release 9, referred to herein as the 25.331 specification and incorporated herein by reference, addresses some aspects of UMTS RRC (Radio Resource Control) protocol requirements between the UMTS Terrestrial Radio Access Network (UTRAN) and the mobile user equipment (UE).

More particularly clauses 8.3.1.2 and 8.6.2.1 of the 25.331 specification relate to some aspects of the UTRAN mobility information element (IE) URA Identity.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

Figure 1:
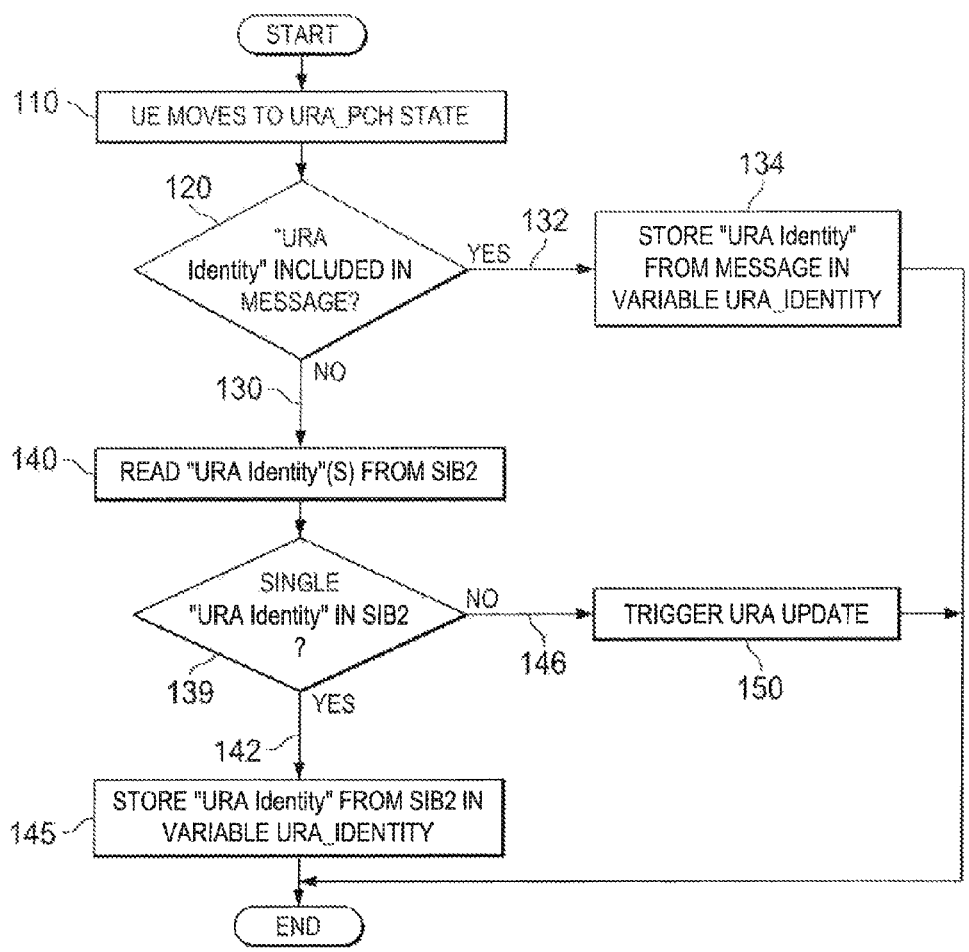
FIG. 1 is a flow diagram capturing the current 3GPP TS25.331 standardised UE behaviour as described therein.

A method and apparatus for handling URA information for a wireless communication device is described herein. In the following description, for the purposes of explanation, numerous specific details are set forth in order to provide a thorough understanding of the new, inventive, and non-obvious concepts disclosed herein (hereinafter "concepts" or "concept"). It will be apparent, however, to one skilled in the art that the technique may be practiced without these specific details. In other instances, well-known structures and devices are shown in block diagram form in order to avoid unnecessarily obscuring the concepts disclosed herein.

The needs identified in the foregoing Background, and other needs and objects that will become apparent from the following description, are achieved by, in one aspect, a method and apparatus for handling URA information for a wireless communication device. In other aspects, concept encompasses a wireless telecommunication device and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

An overview of existing problems are overcome according to the approaches described below. In the Figures, like reference numerals denote like components/messages and are not described unless repetition is required.

There are circumstances in which a UE enters a connected state, identified as the URA paging channel (URA_PCH). A UE in URA_PCH, as opposed to some other connected states, may save on resources since the UE is effectively "asleep" in this mode, but still able to receive incoming pages, perform cell updates, or updates of UTRAN Registration Area, URA (where the URA is a collection of available cells for UEs in connected mode when not transferring data). The URA_PCH state has the advantage of generally being quicker to transfer out of than the Idle state, when for example data transfer is required.

In the case of moving a UE to URA_PCH, the UTRAN issues a down link (DL) message to the UE containing a command to invoke the specific Radio Resource Control (RRC) procedure. To this end, the RRC message includes an IE "RRC State Indicator" set to "URA_PCH". The information element (IE) "URA identity" can be included in the RRC message prompting the state transition so that the (UTRAN and) UE knows what the identity is for the URA that the UE will reside in when entering the state URA_PCH in its current location.

Once in the state URA_PCH, the Standard specifies that the UTRAN is only made aware of the URA a UE is residing in during, for example, a URA update procedure, which is specified to take place for a URA reselection, for example when the UE reselects from a cell belonging to one URA to a cell belonging to another URA, or on periodic URA update. Further examples include when the UTRAN receives an uplink message from a UE in a cell, say Y, then UTRAN is aware of the location of the UE, namely in cell Y.

The handling of UTRAN mobility information elements (IEs) in general is described in the "Standard" section 8.6.2 of the 3GPP Technical Specification (TS) 25.331. Specific reference to URA identity is in section 8.6.2.1.

Reference is now made to FIG. 1. A DL RRC message transitioning a UE to the URA_PCH state 110 may, or may not, include the IE "URA identity" 120. The Standard specifies procedure where the message does include 132 the IE URA identity, the identity is stored 134 in the UE variable URA_IDENTITY. Section 8.6.2.1 of the Standard specifies procedure when there is no IE URA identity 130 included in the RRC message. The Standard specifies that in this case, after moving to the state URA_PCH 110, the UE selects and camps on a cell, and reads SIB 2 in that cell 140. It is determined at 139 whether there is a single URA Identity in SIB2 139. If SIB 2 read in the selected cell contains a single URA identity 142, then this URA identity is stored in the variable URA_IDENTITY 145.

The Standard states that if SIB 2 has more than one URA identity 146, the list of URA identities is empty, or if SIB2 can not be found, then providing a URA update procedure is not ongoing, then a URA update procedure is to be initiated 150 after entering URA_PCH. According to section 8.3.1.2 the UE shall perform a URA update procedure using the cause "change of URA" in order to enable the UTRAN to determine the current URA of the UE.

The standard also states that if SIB 2 has more than one URA identity, the list of identities is empty, or SIB2 can not be found, then if a URA update procedure is ongoing, then according to section 8.3.1.10 the UE shall send a URA UPDATE message using the cause "change of URA" in order to enable the UTRAN to determine the current URA identity of the UE.

UE mobility is not under complete control of UTRAN when the UE is in the URA_PCH state. There are scenarios for which the UTRAN will not have knowledge of the actual cell or URA in which a UE resides in the URA_PCH state, including, for example, when a UE re-enters in service area in URA_PCH after being out of service area. There are therefore, for example, cases when the UE and the UTRAN can be out of sync in relation to the URA in which each understands the UE to be located in.

The following examples illustrate some of the scenarios in which the understanding between the UTRAN and the UE as to which URA identity the UE is located in, may become desynchronised. The approaches, discussed below relate to the reception of RRC message received from the UTRAN in which the target state is specified to be URA_PCH. That is, the RRC message content has an "RRC State Indicator" IE set to URA_PCH. The RRC message is a reconfiguration message (including 5 messages described in the Standard 8.2.2.3 RADIO BEARER SETUP message, RADIO BEARER RECONFIGURATION message, RADIO BEARER RELEASE message, TRANSPORT CHANNEL RECONFIGURATION message or the PHYSICAL CHANNEL RECONFIGURATION message) as well as the Cell Update Confirm or URA Update Confirm messages.

1. At transition from CELL_DCH to URA_PCH state, or at transition from CELL_FACH to URA_PCH with the IE "frequency info" included then the UTRAN can not know which cell the UE will select. If the UE is close to a boundary between URAs then the UTRAN can not know which URA the UE will select and as a consequence the UE could end up in a URA that is different from the one in which the UTRAN considers the UE to be located.

Even in the case that a UE is transitioning from CELL_FACH to URA_PCH state without the IE "frequency info" the UE is required to select a suitable cell and there is no strict requirement that the UE remains camped on the cell that sent the message. Hence, even in this case it is risky for the UTRAN to not provide the URA identity.

2. At transition to URA_PCH state where the message does not include the URA identity then the UE is required to read the URA identity from SIB2. It is possible that a cell reselection could occur before SIB2 has been acquired. In such a case the UTRAN can not be aware of the cell to which the UE has reselected or it's URA identity.

Figure 2:
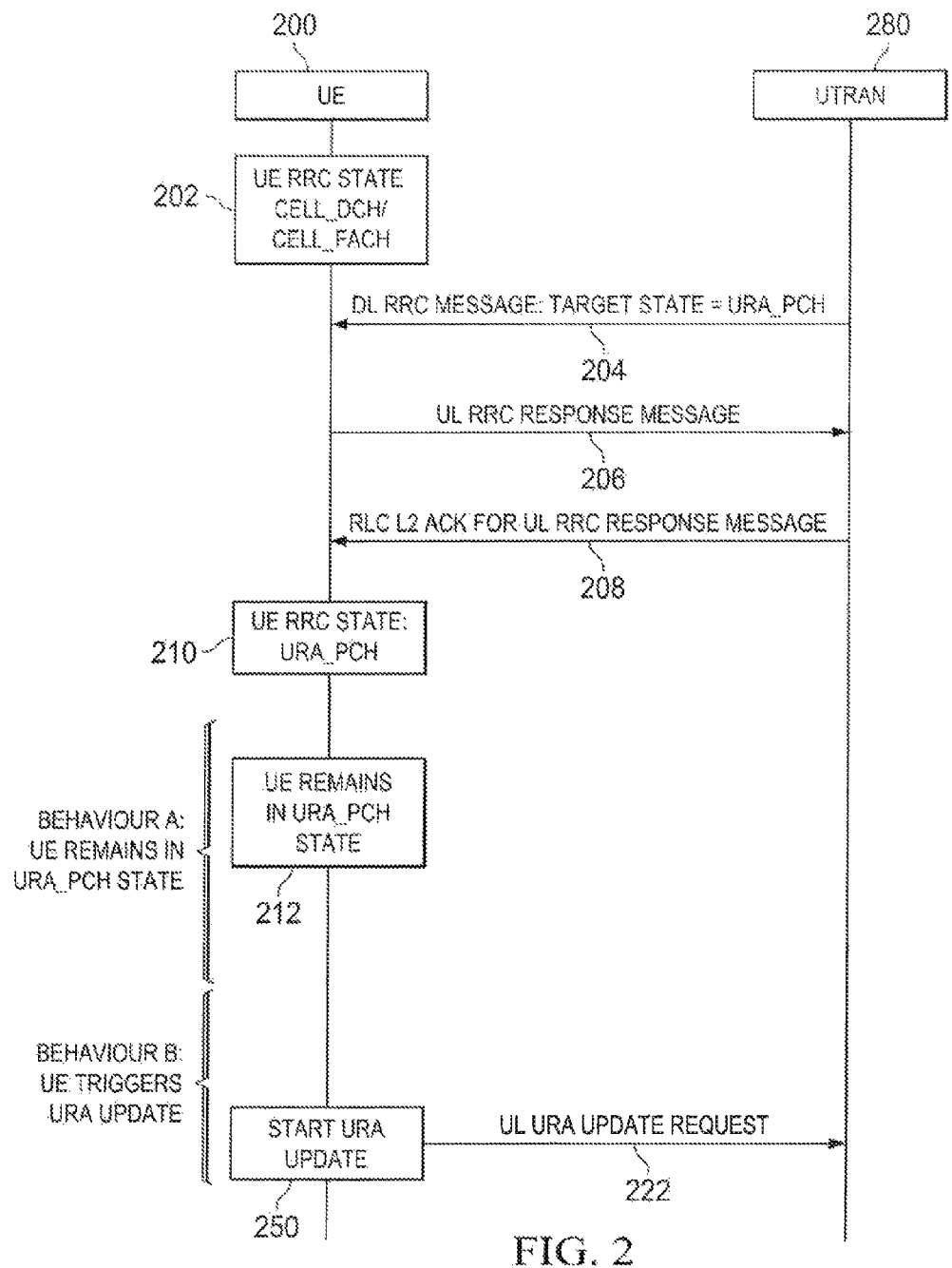
FIG. 2 is a message sequence diagram illustrating steps performed according to a first aspect of the approach described herein.

Referring to FIG. 2, the UE 200 is initially in an RRC Cell_DCH or Cell_FACH state 202. A RRC message 204 is received from the UTRAN 280 in which the target state is specified to be URA_PCH. That is, the RRC message contents have an "RRC State Indicator" IE set to URA_PCH. The RRC message is a reconfiguration message (including 5 messages described in the Standard 8.2.2.3 RADIO BEARER SETUP message, RADIO BEARER RECONFIGURATION message, RADIO BEARER RELEASE message, TRANSPORT CHANNEL RECONFIGURATION message or the PHYSICAL CHANNEL RECONFIGURATION message) as well as the Cell Update Confirm or URA Update Confirm messages.

The UE sends an Uplink (UL) RRC response message 206 back to the UTRAN 280, and in turn receives a RLC L2 ACK for UL RRC response message 208. On receiving the RLC L2 ACK message for the UL RRC response message 208, the UE then transitions to (moves to, or enters) the state URA_PCH 210.

When the UE is transitioned to the URA_PCH state, the UTRAN may not have certain knowledge of the cell, (and hence URA) in which the UE will reside, and this can give rise to problems. For example, the UTRAN might assume that the UE will select a certain cell and determine its URA identity from SIB2 of that cell. In particular this occurs when the UE determines that the URA identity stored in the variable URA_IDENTITY matches one of the URA identities in SIB2, or SIB2 only has a single URA identity, then the UE remains 212 in URA_PCH state—this is considered behaviour A (FIG. 2). However the UE might select a different cell with a different URA identity to the one expected by the UTRAN, or it may be ambiguous to the UE as to what the URA identity in the cell is, for example if the if system information block type 2 of the selected cell contains more than one URA identity, the list of URA identities in system information block type 2 is empty or if the system information block type 2 can not be found, and hence the UTRAN and UE may be out of sync in relation to the URA in which the UE is residing. When the UTRAN wishes to contact the UE it will send paging messages in the cells of the URA in which the UTRAN believes the UE is residing and hence, as the UE is actually residing in a different URA, it may not be possible for a UTRAN 280 to contact the UE 200. In these cases the UE is considered to follow behaviour B (FIG. 2) and start URA Update procedure, with UE 200 sending a URA update message 222 to the UTRAN 280.

EXAMPLE 1

Figure 3:
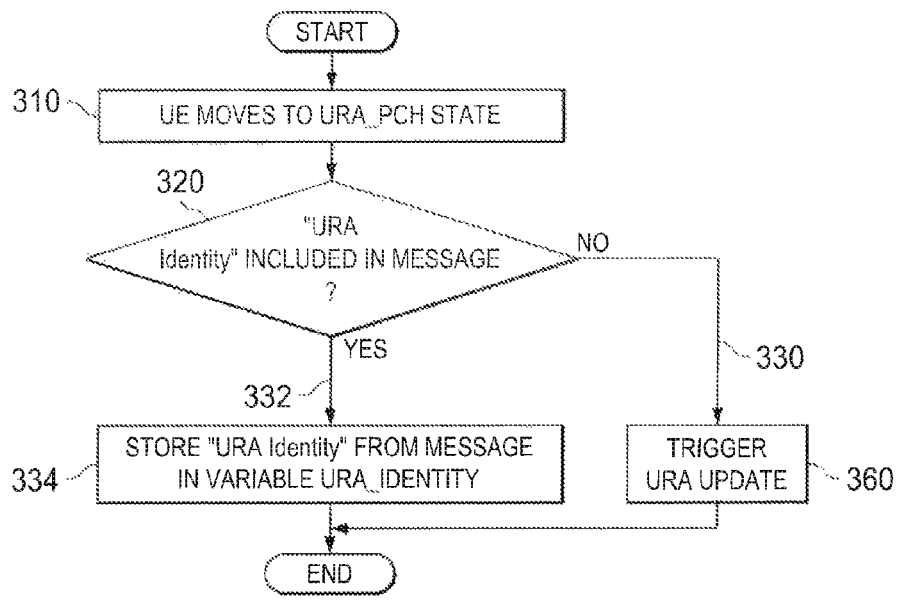
FIG. 3 is a flow diagram illustrating the decision steps according to the first aspect of the approach described herein.

The RRC message received at the UE does not include URA information indicating a URA identity for the device in the new state. In this example, the message does not explicitly include URA information, by not including the IE "URA identity". Reference is now made to FIG. 3. In this embodiment, it is determined that the "URA identity" IE is not included in the received message 330, and if the IE "RRC State Indicator" is included and set to URA_PCH then the UE 300 responsively initiates, or "triggers", a URA update procedure 360 after transitioning to the URA_PCH state 310.

In particular, at 310 in Figure, the UE moves to the state URA_PCH. At 320, it is determined whether the IE "URA identity" is included in the message. If it is included 332, then as specified in the Standard, the URA identity is stored in the UE variable URA_IDENTITY 334. It is not included 330, then the URA update is triggered 360. If no URA Update procedure is ongoing the UE initiates a URA update procedure after entering URA_PCH state, and according to 8.3.1.2, initiates a URA update procedure for URA reselection, the UE performs URA Update by sending the URA Update message to the UTRAN, using the cause set to "change of URA". In addition if a URA update procedure is ongoing the UE takes actions as specified in 8.3.1.10, as if a "confirmation error of URA identity list" has occurred and behaves according to 8.3.1.3 and shall transmit a URA UPDATE message, and set the IE "URA update cause" according to 8.3.1.2 using the cause "change of URA".

In another embodiment, the UE sends the URA Update message setting the IE "URA update cause" according to 8.3.1.2 with the cause "change of URA" on receipt of the RRC reconfiguration message from which the IE "URA identity" was not included but the IE "RRC State Indicator" is included and set to URA_PCH, before or during transitioning, or sent in a predetermined period after transitioning to URA_PCH state.

In this way, the UTRAN will have knowledge of the URA of the UE after transitioning to the URA_PCH state. This embodiment addresses problems that might arise due to the UTRAN not being aware of the URA of the UE, or being out of the sync with respect to the UE, regarding the URA identity. The result offers, for URA_PCH state, a simple and reliable approach to the handling URA information. Further, the determination by the UE that a URA update procedure is to be initiated is made based upon the received message prompting the state transition and the UE does not need to, for example, obtain, or attempt to obtain information such as that in SIB 2, which is available only after the transition or in the new state, which is advantageous to resources and flexibility in the timing of the initiation of the URA update request.

EXAMPLE 2

Figure 4:
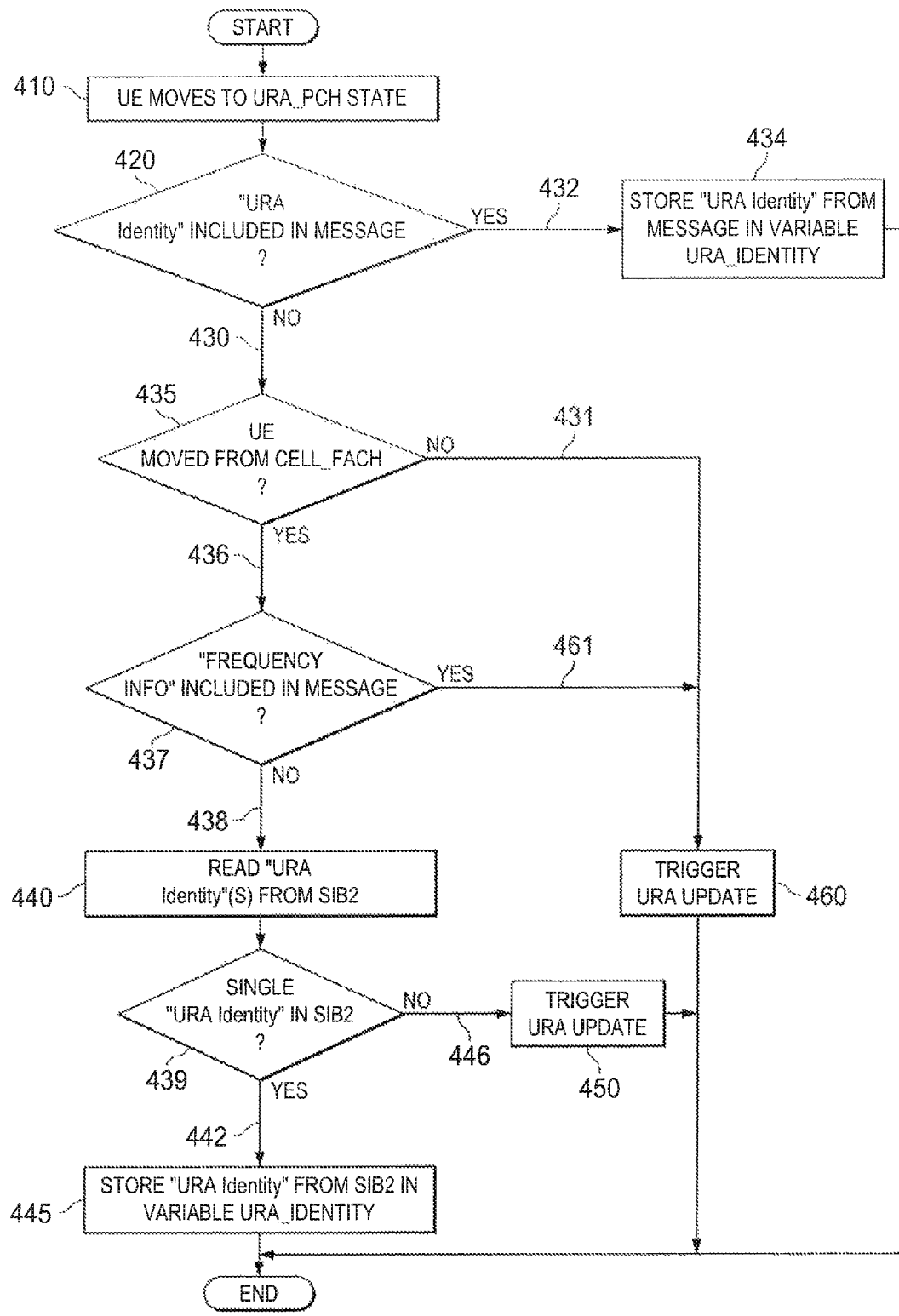
FIG. 4 is a flow diagram illustrating steps performed according to a second aspect of the approach described herein.

A further example is illustrated in FIG. 4. The UE is initially in one of the connected states Cell_DCH or Cell_FACH. A RRC message is received in which the target state is specified to be URA_PCH i.e. the message has an IE "RRC State Indicator" set to URA_PCH to move the UE 400 to state URA_PCH 410. The RRC message is a reconfiguration message (including 5 messages described in the Standard 8.2.2.3 RADIO BEARER SETUP message, RADIO BEARER RECONFIGURATION message, RADIO BEARER RELEASE message, TRANSPORT CHANNEL RECONFIGURATION message or the PHYSICAL CHANNEL RECONFIGURATION message) as well as the Cell Update Confirm or URA Update Confirm messages.

In this example, at the UE the IE "URA identity" is not included in the received message and the IE "RRC State Indicator" is included and set to URA_PCH. The UE sends a UL RRC response message back to the UTRAN, and in turns receives a RLC L2 ACK for UL RRC response message. The UE then enters URA_PCH state 410.

In this embodiment, as shown in FIG. 4, 420 is a determination of whether the IE "URA identity" is included in the message. If the IE is included 432, then at 434 the IE "URA identity" in the message is stored in the variable URA_IDENTITY. If the UE the "URA identity" IE is not included 430 in the received message for which the IE "RRC State Indicator" is included and set to URA_PCH, then at 435—either the UE was previously in a state Cell_FACH 436, or it was not previously the state Cell_FACH 431. If the state transition is from Cell_FACH 436, then at 437 there are again two options—either the IE "Frequency Info" is included in the message 461, or it is not included in the message 438. If IE "Frequency Info" is absent 438 in the received message, the UE reads "URA identity" from SIB2 at 440. At 439 there are two possibilities—one that SIB 2 in the selected cell contains a single URA identity 442 (i.e. is unique—not zero or two for example), and if this is so then the UE stores this URA identity in the variable URA_IDENTITY 445.

Or if the IE "URA identity" is not included in the received message 430, and if the IE "RRC State Indicator" is included and set to URA_PCH, then if the state transition is from Cell_FACH 436 and IE "Frequency Info" is absent in the received message 438, and at 439 SIB 2 in the selected cell does not contain only a single URA identity 446, then a confirmation error of URA identity list has occurred and the UE performs the URA update procedure 450 according to Standards section 8.6.2.1 and the UE triggers a URA update procedure according to the standard section 8.3.1.10.

Else if at the UE the "URA identity" IE is not included in the received message 430, and if the IE "RRC State Indicator" is included and set to URA_PCH and if the state transition is from a state that is not Cell_FACH 431 e.g. Cell_DCH, or if the transition is from Cell_FACH 436 and IE "Frequency Info" is present in the received message 461, in one embodiment the UE determines a confirmation error of URA identity list has occurred. The UE performs the URA update procedure 460 according to Standards section 8.6.2.1. In particular if no URA Update procedure is (already) ongoing the UE initiates a URA update procedure after entering URA_PCH state, and according to 8.3.1.2, initiates a URA update procedure by sending the URA Update message 422 to the UTRAN 480, using the cause set to "change of URA". In another embodiment addition if a URA update procedure is (already) ongoing the UE takes actions as specified in 8.3.1.10, as if a "confirmation error of URA identity list" has occurred and behave according to 8.3.1.3 and shall transmit a URA Update message to the UTRAN, and set the IE "URA update cause" according to 8.3.1.2 using the cause "change of URA".

When the "URA identity" IE is not included in the received message 430, and if the IE "RRC State Indicator" is included and set to URA_PCH and if the state transition is from CELL_FACH to URA_PCH 436 and the message does not include IE "frequency info" 438 then the UE remains in the current cell at the state transition. Thus the UTRAN can know in which cell and URA the UE will reside in after the state transition, and hence the problem of de-synchronisation between the UE and UTRAN in relation to the URA in which the UE is residing can be avoided.

Additionally, in this example, the UE is required to send a URA update depending on the pre transition state, and whether the message includes cell change information. In this example, the cell change information—information prompting a change of cell—is the IE "Frequency Info". If it is determined that the pre transition state (the state on receipt of the RRC message) is Cell_FACH 436; then if the IE "Frequency Info" is not in the message 438, then the URA checking procedures specified in the Standard in section 8.2.2.3 whereby the UE select a suitable UTRA cell according to TS25.304 are followed. If, for a Cell_FACH pre transition state, there is an IE "Frequency Info" in the RRC message, the UE shall initiate a URA update procedure. In this example, the UE performs a URA update procedure to the UTRAN, after entering URA_PCH state, with a cause set to "Change of URA".

Further, if it is determined that the pre transition state is not Cell_FACH 431, but is Cell_DCH; then the UE is arranged to initiate a URA update procedure 460, in this case also. In this example, the UE sends a URA Update message to the UTRAN, after entering the URA_PCH state, with a cause set to "Change of URA".

The use of a URA update procedure if the pre transition state is Cell_FACH and the transition message has IE "Frequency Info", or for a Cell_DCH pre transition state, addresses the problems that UTRAN may still have contacting the UE even when SIB 2 can be read and there is a single URA identity. As for example 1, since in this example the UE may camp on a cell in the URA_PCH state, the UTRAN may not have certain knowledge of the URA that the UE finally resides in, in the URA_PCH state, when no IE "URA identity" is given in the message. By this embodiment, the UTRAN is kept informed of the URA and thus can contact the UE as required.

According to this example, the UE is not required to initiate a URA update procedure if the state transition is from CELL_FACH and the IE "Frequency Info" is absent in the received message, and System Information Block type 2 in the selected cell contains a single URA identity. In this case, the UE is likely to remain on the current serving cell, and thus the UTRAN will already be aware of the cell (and thus URA) in which the UE will reside after moving to the URA_PCH state. The determination is based upon information available before the state transition, and is at least in part dependent upon the RRC state of the UE on receipt of the RRC reconfiguration message signalling the transition to URA_PCH state.

EXAMPLE 3

Figure 5:
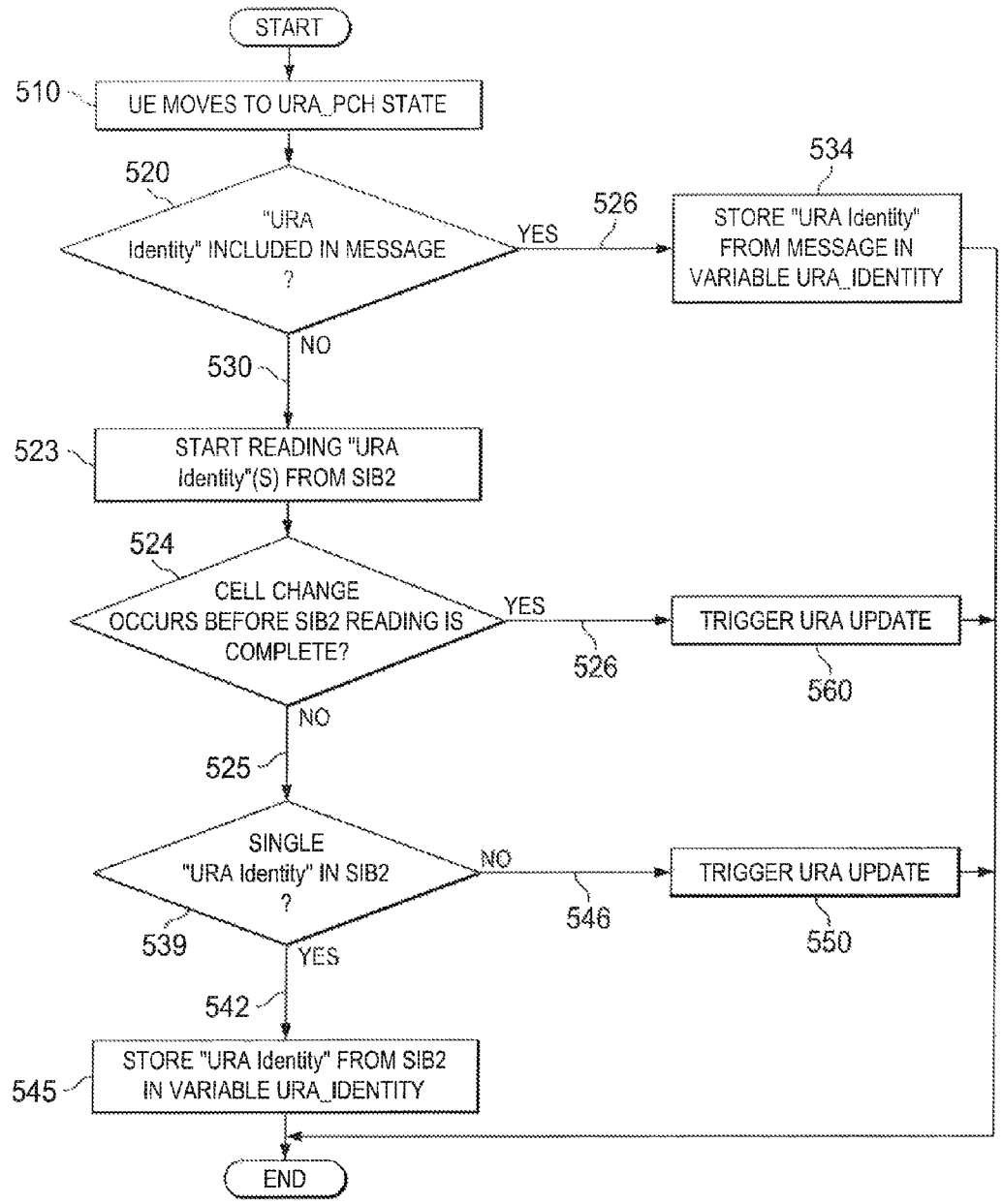
FIG. 5 is a flow diagram illustrating steps performed according to a third aspect of the approach described herein.

A further embodiment is illustrated in FIG. 5. In this embodiment, the UE is initially in one of the connected states such as Cell_DCH, or Cell_FACH and receives an RRC message to move it to URA_PCH state 510. The IE "RRC State Indicator" is included and set to URA_PCH. The UE sends an Uplink (UL) RRC response message back to the UTRAN, and in turn receives a RLC L2 ACK for UL RRC response message. On receiving the RLC L2 ACK message for the UL RRC response message, the UE then enters to (moves to, or transitions) the URA_PCH state.

In FIG. 5, 520 is a determination of whether the IE "URA identity" is included in the message. If it is included 532, then at 534 the URA identity from the message is stored in variable URA_IDENTITY. If the IE "URA identity" is not included in the received message 530, once in the state URA_PCH, the UE attempts to read 523 SIB2 from the cell in order to determine the URA in which it resides and store this URA identity in the UE variable URA_IDENTITY. However, in this example at 524 the UE undergoes a cell change from one cell to another, here a cell reselection. It may be that the cell change occurs before SIB2 reading is complete—i.e. before the UE has successfully read and/or stored the URA identity in SIB2 526. As the UTRAN can not know the new cell and hence the new URA in which the UE now resides, if the UE were to read and store the URA identity from SIB2 from the new cell then it would result in a risk of the UE and UTRAN being out of sync with regard to the URA in which the UE is residing. In this example, in this case whether the cell change has occurred before the SIB2 reading and/or storing is complete 526, a URA update is triggered 560 when the UE has selected a new cell on which to camp and read and stored the URA identity from the SIB2 in the new cell.

If the cell change does not occur before the SIB2 reading is complete 525, then at 539 it is determined whether there is a single URA identity in SIB2. If there is not, then a URA update is triggered 550. If there is a single URA identity 542 in SIB2, then at 545 it is stored in the UE variable URA_IDENTITY.

As discussed above, the Standard clause 8.3.1.2 specifies when a UE in a URA_PCH shall initiate a URA update procedure. The Standard states the URA update procedure enables the UE to retrieve a new URA identity after cell reselection to a cell not belonging to the current URA assigned to the UE in URA_PCH state. In particular in case of a cell reselection, if the UE detects that the current URA assigned to the UE, stored in URA_IDENTITY variable, is not present in the list of URA identities read from SIB 2, or if the list if URA identities in SIB 2 is empty, or if SIB 2 can not be found, then the UE is to perform a URA update procedure using the cause "change of URA".

Alternatively, this embodiment also applies to the situation where the UE may re-enter in service area in URA_PCH state after being out of service (oos) area.

After transitioning to URA_PCH, the Standard states that the UE camps on a cell, read a single value of URA_IDENTITY from SIB 2 in that cell, and store a value for URA identity in the variable URA_IDENTITY.

However, the approach of the Standard leaves incidents where the UTRAN will not be aware of the URA in which the UE resides. To address this, whilst still minimising use of resources, the UE is arranged in this embodiment to determine whether, when cell reselection/re-entry in service area from out of service area occurs, the variable URA_IDENTITY stored in the UE is empty, as is the case if a cell change has occurred before SIB2 reading is complete 526.

If it is determined on cell reselection (or entry into service into URA_PCH) that the variable URA_IDENTITY is empty 526, then this is a further criteria for which the UE is arranged to perform a URA update 560, for example by initiating the URA update procedure and sending a URA Update message to the UTRAN with the cause set to "Change of URA". If the variable is not empty, then the UE follows the Standard URA checking procedure of clause 8.3.1.10. The determination of whether the variable is empty or not is made when the cell change occurs, although in another example, it may be made at another time such as soon after [GPY—probably should distinguish leaving currently selected cell as well as camping on a new selected cell as distinct examples of when a cell change occurs] In one example, when the UE moves out of URA_PCH, or goes oos there from, the variable URA_IDENTITY is cleared. Cell change may comprise leaving currently selected cell as well as camping on a new selected cell. In one example, when the UE moves out of URA_PCH, or goes oos there from, the variable URA_IDENTITY is cleared.

In this way the UE in URA_PCH state, if a cell reselection (or re-entry into service into URA_PCH) occurs when the variable URA_IDENTITY is empty the UTRAN can be made aware of the URA of the UE. The assessment of whether the update is required may be made independent of SIB 2 or its scheduling. Problems such as inability for the UTRAN to page the UE for a call, or sending of downlink data, are minimised according to this embodiment.

As an illustration, it may be the case that the UE is in URA_PCH after receiving a message to transition to that state, with the RRC message not including the IE "URA identity". After transitioning to the state URA_PCH, a UE camps on a cell 1, for example. SIB2 scheduled in cell 1 has IE "URA identity list" set to 1 and IE "URA identity" U1. However, before reading SIB 2 in cell 1, the UE may move to a cell 2 based on, for example, cell reselection criteria, while for example, still observing the minimum mandatory time of 1 s on cell 1. For example, SIB 2 can be scheduled anywhere between SFN Cycle (i.e. 40960 millisecond). The UE can start evaluating cell reselection to a better cell after camping on the cell for 1 second (see section 5.2.6.1.4 of the Standard 25.304). So after the cell reselection to cell 2, the variable URA_IDENTIY in the UE is empty.

Thus, in this illustration, the UTRAN may not know the correct URA in which the UE resides. According to this example, therefore, when it is determined that the variable URA_IDENTITY is empty after a cell reselection (here since no IE "URA identity" was read and/or stored in cell 1) 526, then a URA update procedure is initiated 560. The UTRAN will therefore know the correct URA of the UE, even in this case when the UE has moved from cell 1 to cell 2 without reading SIB 2 in cell 1. In a further embodiment, the UE initiates a URA update procedure when it is determined that the variable URA_IDENTITY is empty on completion of the reselection (or re-entry in service area).

EXAMPLE 4

Figure 6:
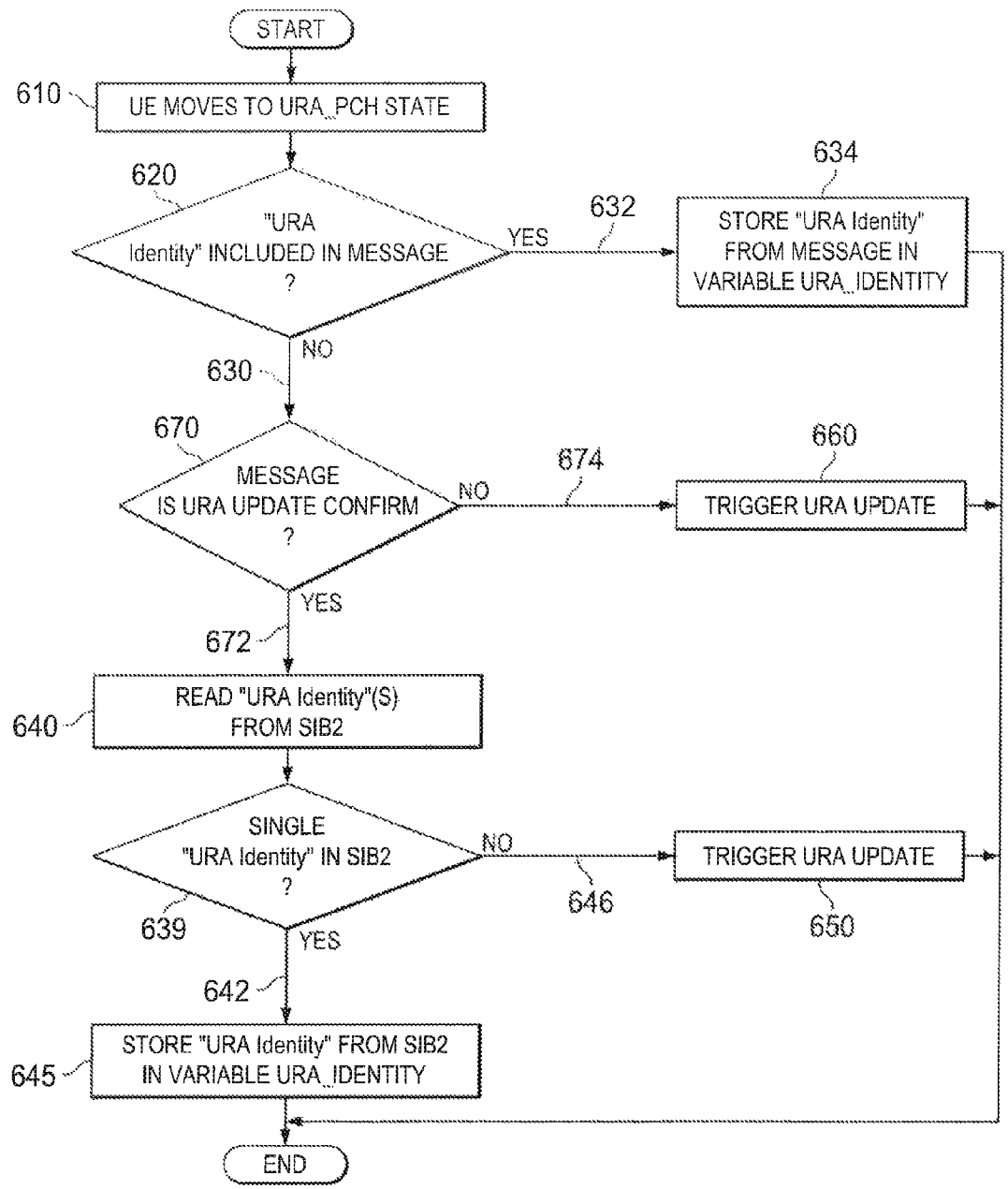
FIG. 6 is a flow diagram illustrating steps performed according to a fourth aspect of the approach described herein.

A further example is illustrated in FIG. 6. The UE is initially in one of the connected states Cell_DCH or Cell_FACH. A RRC message is received in which the target state is specified to be URA_PCH i.e. the message has an IE "RRC State Indicator" set to URA_PCH. The RRC message may be a reconfiguration message (including 5 messages described in the Standard 8.2.2.3 RADIO BEARER SETUP message, RADIO BEARER RECONFIGURATION message, RADIO BEARER RELEASE message, TRANSPORT CHANNEL RECONFIGURATION message or the PHYSICAL CHANNEL RECONFIGURATION message) as well as the Cell Update Confirm or URA Update Confirm messages.

The UE sends a UL RRC response message back to the UTRAN, and in turns receives a RLC L2 ACK for UL RRC response message. The UE then enters URA_PCH state 610.

In this example, at 620, the message may 632, or may not 630, include the IE "URA identity". If it is included in the message 632, then at 634 the URA identity is stored in the UE variable URA_IDENTITY. At 630, the IE "URA identity" is not included in the received RRC message and the IE "RRC State Indicator" is included and set to URAPCH.

In this embodiment if the UE the "URA identity" IE is not included in the received message 630, and if the IE "RRC State Indicator" is included and set to URA_PCH 610, then at 670 it is determined if the message is a URA Update Confirm message. If the received RRC message is a URA Update Confirm message, 672, and at 639 it is the case that SIB 2 in the selected cell contains a single URA identity 642 (i.e. is unique—not zero or two for example), then the UE stores this URA identity in the variable URA_IDENTITY 645.

Or if the IE "URA identity" is not included in the received message 630, and if the IE "RRC State Indicator" is included and set to URA_PCH 610, then if the received message is a URA Update Confirm message 670, and at 639 in FIG. 6 SIB 2 in the selected cell does not contain only a single URA identity 646, then a confirmation error of URA identity list has occurred and the UE performs the URA update procedure 650 according to Standards section 8.6.2.1 and the UE triggers a URA update procedure transmitting a URA Update message to the UTRAN, and set the IE "URA update cause" according to 8.3.1.2 using the cause "change of URA".

Else if at the UE the IE "URA identity" is not included in the received message 630, and if the IE "RRC State Indicator" is included and set to URA_PCH 610 and if the received message is not a URA Update confirm message 674, in one embodiment the UE determines a confirmation error of URA identity list has occurred. The UE performs the URA update procedure 660 according to Standards section 8.6.2.1. In particular if no URA Update procedure is (already) ongoing the UE initiates a URA update procedure after entering URA_PCH state, and according to 8.3.1.2, initiates a URA update procedure by sending the URA Update message to the UTRAN, using the cause set to "change of URA". In another embodiment addition if a URA update procedure is (already) ongoing the UE takes actions as specified in 8.3.1.10, as if a "confirmation error of URA identity list" has occurred and behave according to 8.3.1.3 and shall transmit a URA Update message to the UTRAN, and set the IE "URA update cause" according to 8.3.1.2 using the cause "change of URA".

In this embodiment, the UE is required to send a URA update depending on whether the received message is a URA Update Confirm message 670. If it is determined that the received RRC message does not contain a IE "URA identity" 630 and is a URA Update Confirm message 672, then if the SIB2 in the selected cell contains only a single URA identity 642 then the UE stores this value of URA identity in the variable URA_IDENTITY 645.

If, the received RRC message does not contain a IE "URA identity" 630 and is a URA Update Confirm message 672, and if the SIB2 in the selected cell does not contains only a single URA identity 646, the UE shall initiate a URA update procedure 650. In this example, the UE performs a URA update procedure to the UTRAN, after entering URA_PCH state, with a cause set to "Change of URA".

Further, if, the received RRC message does not contain a IE "URA identity" 630 and is not a URA Update Confirm message 674, the UE shall initiate a URA update procedure 660. In this example, the UE performs a URA update procedure to the UTRAN, after entering URA_PCH state, with a cause set to "Change of URA".

By this embodiment, the UTRAN is kept informed of the URA and thus can contact the UE as required.

As a variant of this embodiment, the condition checked in the decision process 670 may be modified to check if the message is a URA Update Confirm message or the message is a Cell Update Confirm message where the IE "frequency information" is absent. With this variation of the embodiment, if it is determined that the received RRC message does not contain a IE "URA identity" 630 and is a Cell Update Confirm message where the IE "frequency info" is absent or a URA Update Confirm message 672, then if the SIB2 in the selected cell contains only a single URA identity 642 then the UE stores this value of URA identity in the variable URA_IDENTITY 645.

Figure 7:
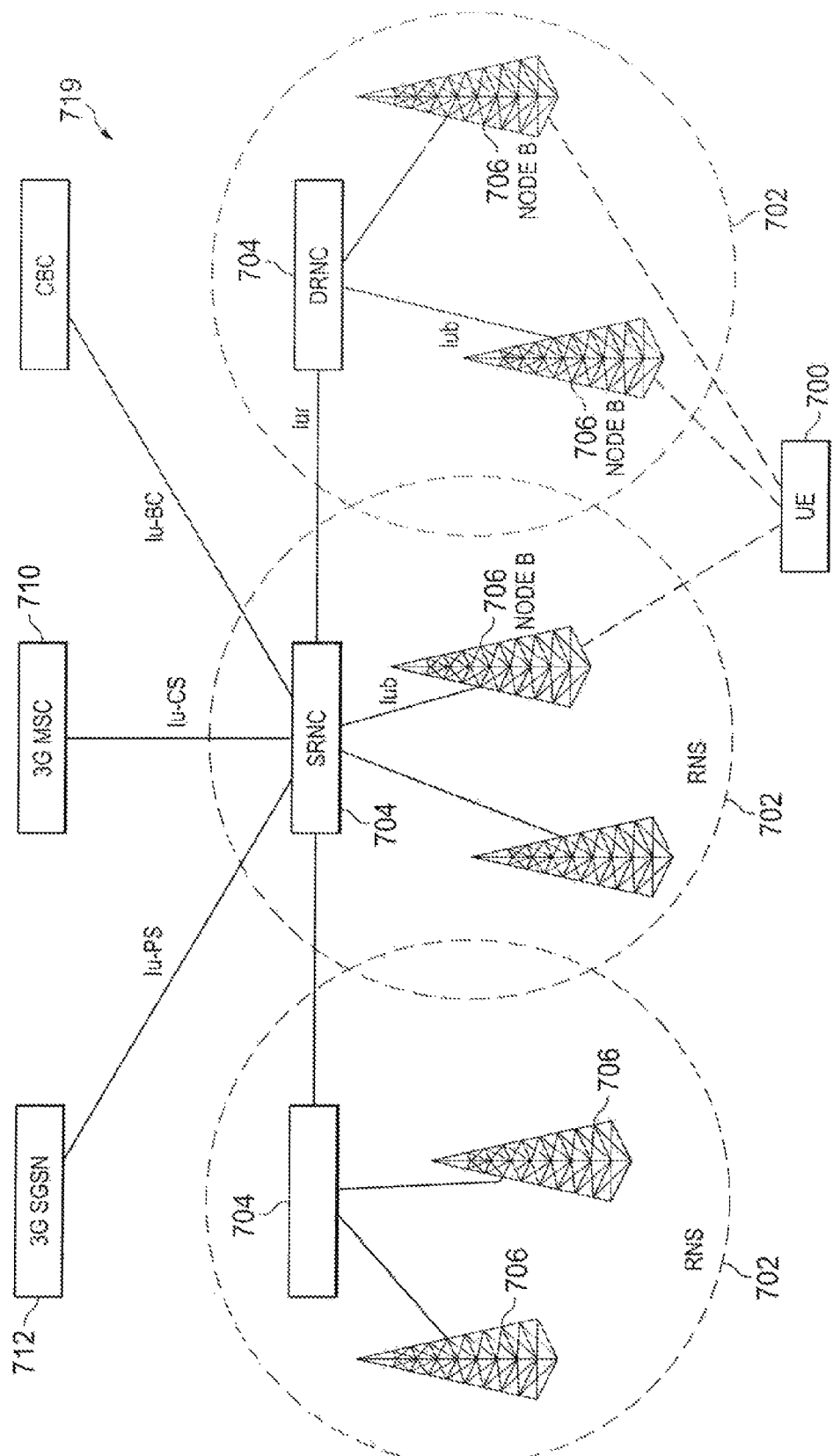
FIG. 7 shows an overview of a network and a UE device.

FIG. 7 shows an overview of a network and a UE device. Clearly in practice there may be many UE devices operating with the network but, for the sake of simplicity, FIG. 7 only shows a single UE device 700. For the purposes of illustration, FIG. 7 also shows a network 719 having a few components. It will be clear to a person skilled in the art that in practice a network will include far more components than those shown.

FIG. 7 shows an overview of the radio access network 719 (UTRAN) used in a UMTS system. The network 719 as shown in FIG. 7 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 700 may be mobile within the radio access network. Radio connections (indicated by the straight dotted lines in FIG. 7) are established between the UE and one or more of the Node Bs in the UTRAN.

The radio network controller controls the use and reliability of the radio resources within the RNS 2. Each RNC may also connected to a 3G mobile switching center 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 8:
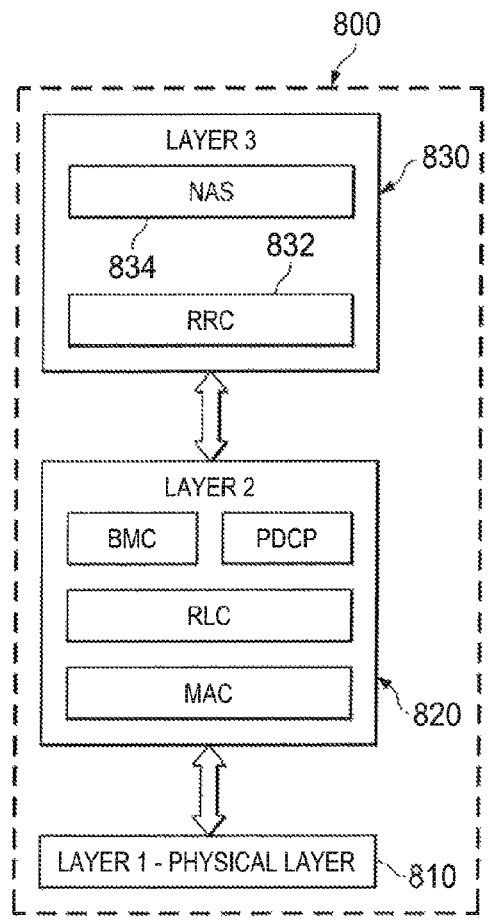
FIG. 8 is a block diagram illustrating an embodiment of a protocol stack provided in a UE.

FIG. 8 is a block diagram illustrating an embodiment of a protocol stack provided in a UE. A Radio Resource Controller (RRC) block 832 is a sub layer of Layer 3 830 of a UMTS protocol stack 800. The RRC 832 exists in the control plane only and provides an information transfer service to the non-access stratum NAS 834. The RRC 832 is responsible for controlling the configuration of radio interface Layer 1 810 and Layer 2 820. When the UTRAN wishes to change the UE configuration it will issue a message to the UE containing a command to invoke a specific RRC procedure. The RRC layer 832 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for a method and apparatus for handling cell registration area information for a wireless communication device as discussed above with reference to the drawings may be implemented by the RRC block 832.

Figure 9:
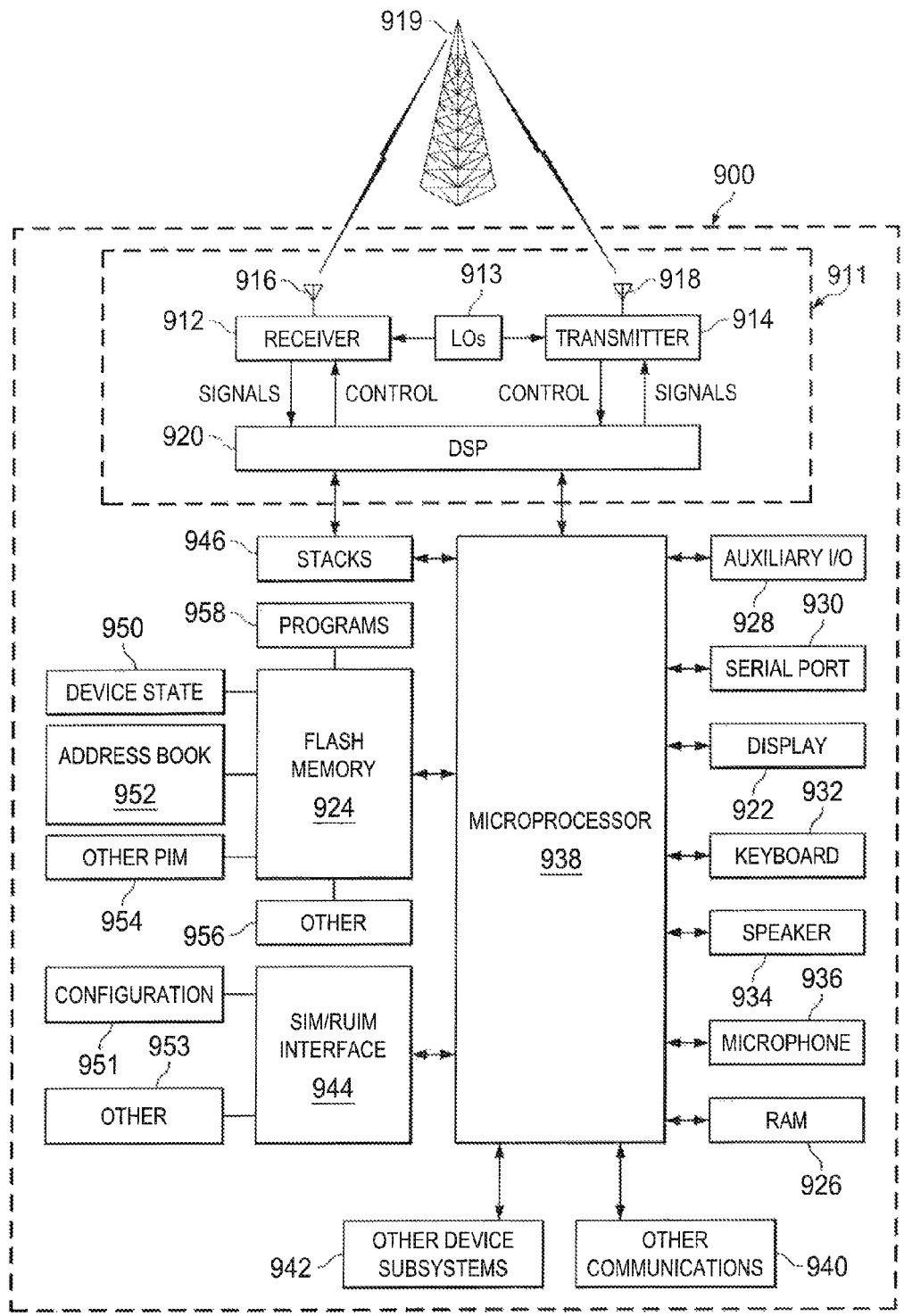
FIG. 9 is a block diagram illustrating a mobile device.

Turning now to FIG. 9, FIG. 9 is a block diagram illustrating a mobile device, which can act as a UE and co-operate with the apparatus and methods of FIGS. 1 to 6, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and processing means such as a processing module such as a digital signal processor (DSP) 20. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, EDGE network or LTE network.

Network access requirements will also vary depending upon the type of network 902. For example, in the Mobitex and DataTAC networks, mobile station 900 is registered on the network using a unique identification number associated with each mobile station. In LTE, UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 9, analog to digital (N/D) conversion. N/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes processing means such as a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

When mobile device 900 is used as a UE, protocol stacks 946 include a method and apparatus for handling cell registration are information for a wireless communication device.

Extensions and Alternatives

In the foregoing specification, concepts have been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

In one example there is provided a system for handling URA information for a wireless communication device, the device configures to be operable in a mobile telecommunications system, comprising sending by the network of a message indicating the device is to enter a new state, receiving the message at the device; determining by the device that the message does not include a URA information indicating a URA for the device on transition to the new state; and in response initiating by the device a URA update procedure comprising sending a URA update request to the network.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method for handling UMTS Terrestrial Radio Access Network (UTRAN) Registration Area (URA) information for a wireless communication device, the device configured to be operable in a mobile telecommunications system, the method comprising, at the device:
   receiving a message to enter a new, connected state; and
   determining to initiate a URA update procedure when the message does not comprise a UTRAN mobility information element, the determination being independent of information available to the device when the device has entered the new, connected state.

2. The method as claimed in claim 1, further comprising determining to initiate the URA update procedure when: the state of the device on receipt of the message is forward access channel (Cell_FACH) and the message includes cell change information, or the state of the device on receipt of the message is not Cell_FACH.

3. The method as claimed in claim 2, in which the cell change information comprises information element (IE) Frequency Info.

4. The method as claimed in claim 2, further comprising initiating the URA update procedure on receipt of the message, before or during transition to the new connected state, or during a predetermined period after the device enters the new connected state.

5. The method as claimed in claim 1, further comprising determining to initiate the URA update procedure when the message does not comprise a URA update confirm message.

6. The method as claimed in claim 1, further comprising determining to initiate the URA update procedure when: the message does not comprise a URA update confirm message, or if the message does not comprise a Cell update confirm message including cell change information.

7. The method as claimed in claim 1 or claim 2, in which determining to initiate the URA update procedure is configured to be performed without the device attempting to read system information block type-2 (SIB2) in the new, connected state.

8. The method as claimed in claim 1, further comprising:
   determining to initiate the URA update procedure when a URA variable stored in the device is empty on a change of cell in the new, connected state.

9. The method as claimed in claim 8, in which the URA variable is a URA identity variable (URA_IDENTITY).

10. The method as claimed in claim 8, wherein the change of cell comprises cell reselection, or cell selection on re-entry in service area after the device has been out of service area.

11. The method as claimed in claim 8, further comprising clearing the URA variable when initiating the URA update procedure.

12. A wireless telecommunications device comprising:
   a transceiver for transmitting and receiving radio signals;
   a processor; and
   a memory having stored therein: one or more routines executable by the processor, the one or more routines being adapted to handle UMTS Terrestrial Radio Access Network (UTRAN) Registration Area (URA) information in a mobile telecommunications system, wherein at least one of the one or more routines is configured to:
   receive a message to enter a new, connected state; and
   determine to initiate a URA update procedure when the message does not comprise a UTRAN mobility information element, the determination being independent of information available to the device when the device has entered the new, connected state.

13. The device as claimed in claim 12, wherein the device is figure configured to determine to initiate the URA update procedure when: the state of the device on receipt of the message is forward access channel (Cell_FACH) and the message includes cell change information; or the state of the device on receipt of the message is not Cell_FACH.

14. The device as claimed in claim 12, wherein the cell change information comprises the information element (IE) Frequency Info.

15. The device as claimed in claim 12, wherein the device is further configured to initiate the URA update procedure on receipt of the message before or during transition to the new connected state, or during a predetermined period after the device enters the new connected state.

16. The device as claimed in claim 12, wherein the device is further configured to determine to initiate the URA update procedure when the message does not comprise a URA update confirm message.

17. The device as claimed in claim 12, wherein the device is further configured to determine to initiate the URA update procedure when: the message does not comprise a URA update confirm message, or the message does not comprise a Cell update confirm message including cell change information.

18. The device as claimed in claim 12 or claim 13, wherein the device is further configured to determine to initiate the URA update procedure without the device attempting to read system information block type-2 (SIB2) in the new connected state.

19. The device as claimed in claim 12, wherein the device is further configured to determine to initiate the URA update procedure when a URA variable stored in the device is empty on a change of cell in the new, connected state.

20. The device as claimed in claim 19, wherein the URA variable is a URA identity variable (URA_IDENTITY).

21. The device as claimed in claim 19, wherein the change of cell comprises cell reselection, or cell selection on service re-entry after the device has been out of service.

22. The device as claimed in claim 19; wherein the device is further configured to clear the URA variable on initiation of the URA update procedure.

23. The device as claimed in claim 12, wherein the URA information comprises an information element URA Identity; and in which the new, connected state is URA paging channel (URA_PCH).

24. The method as claimed in claim 1, in which the URA information comprises an information element URA identity; and wherein the new, connected state is URA paging channel (URA_PCH).

25. A non-transitory computer readable medium having computer executable instructions stored thereon and when executed on a processor, to cause the processor to perform the method of claim 1.

* * * * *